(12) United States Patent
Shan

(10) Patent No.: US 7,356,074 B2
(45) Date of Patent: Apr. 8, 2008

(54) ESTIMATION OF MULTIPATH CHANNEL WITH SUB-CHIP RESOLUTION

(75) Inventor: Peijun Shan, Jamestown, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 840 days.

(21) Appl. No.: 10/434,252

(22) Filed: May 8, 2003

(65) Prior Publication Data

US 2004/0223540 A1   Nov. 11, 2004

(51) Int. Cl.
*H04B 1/69*  (2006.01)
(52) U.S. Cl. .................................................. 375/150
(58) Field of Classification Search ............. 375/140, 375/142, 143, 144, 145, 148, 149, 150, 152, 375/346, 347, 349, 350
See application file for complete search history.

(56) References Cited

U.S. PATENT DOCUMENTS

| | | | |
|---|---|---|---|
| 5,077,753 A | 12/1991 | Grau, Jr. et al. | 375/1 |
| 5,361,276 A | 11/1994 | Subramanian | 375/1 |
| 5,414,734 A | 5/1995 | Marchetto et al. | 375/267 |
| 5,648,983 A | 7/1997 | Kostic et al. | 375/206 |
| 5,673,286 A | 9/1997 | Lomp | 375/208 |
| 5,689,528 A | 11/1997 | Tsujimoto | 375/233 |
| 5,692,008 A | 11/1997 | Van Nee | 375/208 |
| 5,706,314 A | 1/1998 | Davis et al. | 375/340 |
| 5,809,060 A | 9/1998 | Cafarella et al. | 375/206 |
| 5,995,538 A | 11/1999 | Lomp | 375/208 |
| 6,009,089 A | 12/1999 | Huang et al. | 370/342 |
| 6,069,917 A | 5/2000 | Werner et al. | 375/233 |
| 6,075,812 A | 6/2000 | Cafarella et al. | 375/206 |
| 6,269,075 B1 * | 7/2001 | Tran | 370/206 |
| 6,333,947 B1 | 12/2001 | van Heeswyk et al. | 375/148 |
| 6,442,193 B1 * | 8/2002 | Hirsch | 375/147 |
| 6,541,950 B2 | 4/2003 | Townsend et al. | 324/76.14 |
| 6,546,041 B1 * | 4/2003 | Fujimoto | 375/140 |
| 6,563,858 B1 | 5/2003 | Fakatselis et al. | 375/148 |
| 6,647,077 B1 | 11/2003 | Shan et al. | 375/346 |
| 6,680,968 B2 * | 1/2004 | Black et al. | 375/149 |

(Continued)

FOREIGN PATENT DOCUMENTS

EP   0932263 A2   7/1999

(Continued)

OTHER PUBLICATIONS

Lingwood et al. "ASIC implementation of a direct sequence spread spectrum RAKE receiver" IEEE 44th Vehicular Technology Conference, Jun. 8-10, 1997, pp. 1326-1330.*

(Continued)

*Primary Examiner*—Khai Tran
(74) *Attorney, Agent, or Firm*—Withrow & Terranova, PLLC

(57) ABSTRACT

The present invention provides a method and apparatus for estimating a multipath channel with sub-chip resolution. In general, secondary signals are characterized based on correlating a received signal including multipath signals, which include a main and the secondary signals, with a pseudo-random noise code. An inverse filter operates to increase a temporal resolution of results of the correlation of the received signal and the pseudo-random noise code, thereby allowing secondary multipath signals occurring within the same chip interval as another multipath signal to be detected and estimated correctly.

41 Claims, 9 Drawing Sheets

U.S. PATENT DOCUMENTS

| | | | |
|---|---|---|---|
| 6,700,929 B1 | 3/2004 | Shan et al. | 375/224 |
| 6,728,324 B1 | 4/2004 | Shan et al. | 375/346 |
| 6,862,326 B1* | 3/2005 | Eran et al. | 375/343 |
| 7,103,027 B2* | 9/2006 | Dick et al. | 370/335 |
| 2001/0006539 A1* | 7/2001 | Kim | 375/321 |
| 2002/0118731 A1* | 8/2002 | Hakala | 375/152 |
| 2003/0161416 A1* | 8/2003 | Meyer et al. | 375/343 |
| 2003/0179813 A1* | 9/2003 | Morita et al. | 375/148 |
| 2003/0231714 A1* | 12/2003 | Kjeldsen et al. | 375/259 |
| 2004/0001534 A1* | 1/2004 | Yang | 375/143 |
| 2004/0017846 A1* | 1/2004 | Fernandez-Corbaton et al. | 375/152 |
| 2004/0042531 A1* | 3/2004 | Arikan et al. | 375/148 |
| 2004/0052304 A1* | 3/2004 | Reial | 375/148 |
| 2004/0052306 A1* | 3/2004 | Ibrahim et al. | 375/152 |
| 2004/0071200 A1* | 4/2004 | Betz et al. | 375/152 |
| 2004/0208266 A1* | 10/2004 | Lenosky | 375/346 |
| 2004/0223540 A1* | 11/2004 | Shan | 375/150 |

FOREIGN PATENT DOCUMENTS

| | | |
|---|---|---|
| EP | 0 981 206 A1 | 2/2000 |
| WO | WO 98/26544 | 6/1998 |

OTHER PUBLICATIONS

3COM Corporation, "IEEE 802.11b Wireless LANs," http://www.3com.com/technology/tech_net/white_papers/503072a.html.

Andren, Carl and Webster, Mark, "CCK Modulation Delivers 11Mbps for High Rate IEEE 802.11 Extension," Wireless Symposium/Portable by Design Conference Proceedings, Mar. 14, 2000, XP002147321.

Fuente, M. P., Guo, Y. J., and Barton, S.K., "A New Scheme for Direct Sequence Spread Spectrum Radio LANs," IEEE 4th International Symposium, Mainz Germany, Sep. 22-25, 1996, XP010208831.

Hou, Wen-Shang, and Chen, Bor-Sen, "Adaptive Detection in Asynchronous Code-Division Multiple-Access System in Multipath Fading Channels," IEEE Transactions on Communications, vol. 48, No. 5, May 2000, pp. 863-874.

Kim, Su Il and Lee Hwang Soo, "Performance Improvement of RAKE Receiver for a Multicode DS-CDMA System with Multi-stage Interference Cancellation Detectors," Proceedings of IEEE Tencon '99, Sep. 15-17, 1999, vol. 1, pp. 573-576.

Prasad, Ramjee and Ojanpera, Tero, "An Overview of CDMA Evolution Toward Wideband CDMA," IEEE Communications Surveys, 1998, http://www.comsoc.org/pubs/surveys/4q98issue/prasad.html.

Lingwood, Stephen et al., "ASIC Implementaion of a Direct-Sequence Spread-Spectrum RAKE-Receiver," IEEE 44th Vehicular Technology Conference, Jun. 8-10, 1994, XP010123293.

Väisänen, Kari and Renfors, Markku, "Efficient Digital Filters for Pulse-Shaping and Jitter-Free Frequency Error Detection and Timing Recovery," Signal Processing, vol. 81, No. 4, Apr. 2001 pp. 829-844, XP004234879.

International Search Report for PCT/US2004/014055 mailed Nov. 4, 2004.

Kostic, Zoran and Pavlovic, Gordana, "Resolving Subchip-Spaced Multipath Components in CDMA Communication Systems," IEEE Transactions on Vehicular Technology, vol. 48, No. 6, Nov. 1999, pp. 1803-1808.

Kostic et al, "Estimation of the Parameters of a; Multipath Channel Using Set-Theoretic Deconvolution," IEEE Trnasactions on Communications, vol. 40, No. 6, Jun. 1992, pp. 1006-1011.

Ehrenberg et al, "Final-processing Techniques for Resolving Individual Pulses in Multipath Signal," Journal of the Acoustical Society of America, vol. 63, No. 6, Jun. 1978, pp. 1861-1865.

* cited by examiner

ESTIMATION OF MULTIPATH CHANNEL WITH SUB-CHIP RESOLUTION

FIELD OF THE INVENTION

The present invention generally relates to compensating a received multipath signal in a direct sequence spread spectrum (DSSS) receiver, and particularly relates to estimation of a multipath channel with sub-chip resolution.

BACKGROUND OF THE INVENTION

In wireless communications systems, successfully extracting transmitted information from a received signal oftentimes requires overcoming significant levels of interference. Multipath interference represents one type of received signal interference that can be particularly problematic in certain types of wireless communications systems. For example, wireless local area networks (WLANs) are typically employed in indoor environments that commonly include partitioned walls, furniture, and multiple doorways, along with various metallic and non-metallic building features. In these environments, transmitted signals follow multiple transmission paths of differing lengths and attenuation. Consequently, a receiver in such an environment receives multiple, time-offset signals of differing signal strengths. These multiple versions of the same transmit signal are termed "multipath signals."

The effect of multipath signals on DSSS receiver performance depends upon the particulars of the communications system in question. For example, in certain types of DSSS communications systems, multipath signals can actually improve receiver signal-to-noise ratio. To understand this phenomenon, it is helpful to highlight a few basic aspects of DSSS communications. DSSS transmitters essentially multiply an information signal by a pseudo-noise (PN) code—a repeating, pseudo-random digital sequence. Initially, the information signal is spread with the PN code, and the resultant spread signal is multiplied with the RF carrier, creating a wide bandwidth transmit signal. In the general case, a receiver de-spreads the received signal by multiplying the incoming signal with the same PN code. The receiver's output signal has a maximum magnitude when the PN code exactly matches the incoming received signal. In DSSS systems, "matching" is evaluated based on correlating the incoming PN code with the receiver's locally generated PN code.

The PN code used by the transmitter to spread the information signal significantly influences the effects of multipath signals on receiver performance. DSSS transmissions based on a single PN code (or a set of orthogonal spreading codes) with good autocorrelation properties allow the receiver to selectively de-correlate individual signals within a multipath signal relatively free of interference from the other signals within the multipath signal. By adjusting the offset of the PN code used to generate its local PN code, the receiver can time-align (code phase) its despreading circuitry with any one of the multipath signals it is receiving. If the spreading/despreading PN code has good autocorrelation and cross-correlation properties, the receiver can recover the transmitted data from any one of these multipath signals without undue interference. Of course, it may be preferable to use only the strongest multipath signal(s) for information recovery.

Conventional RAKE receivers used in Code-Division Multiple Access (CDMA) digital cellular telephone systems exploit the above situation. CDMA transmissions use a relatively long, fixed PN code for a given receiver and transmitter pair, which results in very favorable auto- and cross-correlation characteristics. RAKE receivers are well known in the art of digital cellular receiver design. A RAKE receiver includes multiple, parallel "RAKE fingers." Each RAKE finger can independently synchronize with and de-spread a received signal.

By synchronizing the multiple RAKE fingers to the strongest received multipath signals (those with the highest correlation values), the RAKE fingers lock on to the strongest multipath signals. Because of the excellent correlation properties of the CDMA spreading codes, each RAKE finger synchronizes with and de-spreads one of the multipath signals relatively free from interference associated with the other multipath signals. Thus, each RAKE finger de-spreads a relatively clean signal, allowing the overall RAKE receiver to coherently combine (with time/phase alignment) the signals to form a combined output signal that represents the addition of the multipath signals. Coherently combining the multipath signals allows the RAKE receiver to achieve an improvement in signal-to-noise ratio (SNR), essentially meaning that multipath signals can actually improve reception performance in certain types of spread spectrum systems.

Unfortunately, the characteristics of many other types of spread spectrum communications systems greatly complicate how a receiver deals with multipath signals. Some types of DSSS systems use PN codes with poor correlation properties. The IEEE standard for high data-rate WLANs, known as 802.11b, is a primary example of such a system. Standard IEEE 802.11 transmissions use a single spreading code combined with binary phase-shift keying (BPSK) or quadrature phase-shift keying (QPSK) to transmit data at 1 or 2 Mbps, respectively. The 802.11b extensions provide higher data rates by defining 5.5 and 11 Mbps transmission rates. The higher data rates of 802.11b use a modulation format known as Complimentary Code Keying (CCK). The 802.11b CCK-mode transmissions use multiple spreading codes, which change across symbols. While providing the ability to achieve high data transfer rates and still maintain compatibility with the standard 802.11 1 and 2 Mbps channelization scheme, CCK modulation does include the drawback of making it more difficult for receivers to cleanly despread individual multipath signals.

Due to the relatively poor correlation properties of the spreading codes used in 802.11b, the various multipath signals can interfere with each other and result in inter-symbol interference (ISI) at the receiver. Thus, in contrast to the CDMA digital cellular scenario, multipath signals can significantly degrade receiver performance in systems operating under 802.11b standards. Of course, multipath signals may be problematic in any type of DSSS system that uses less-than-ideal spreading codes, so the problem is not limited to WLAN applications. Multipath interference in DSSS systems arises from both inter-chip interference (ICI) and ISI. For the purposes of this disclosure, the term ISI is understood to include both ICI and ISI. From the perspective of a DSSS receiver, each transmitted symbol results in the reception of multiple symbols arriving with relative time offsets from each other, due to the multiple signal propagation paths between receiver and transmitter. ISI, as used herein, describes multipath interference arising from these multiple received symbols and can include interference arising from multipath signal delay spreads exceeding one symbol period.

Effective handling of multipath signals, whether for the purpose of interference compensation, such as in 802.11b environments, or for the purpose of coherent multipath signal combination, such as in RAKE receiver operations, depends upon developing accurate estimates of propagation path characteristics for one or more of the secondary propagation path signals included in the received signal. Under some real world conditions, the delay spread among the individual propagation path signals comprising a received multipath signal exceeds one symbol time, meaning that, at any one instant in time, the various propagation path signals may represent different information values (symbol values), making it potentially difficult to relate one propagation path signal to another. Without the ability to identify and compensate for secondary signals offset from the main signal by more than a symbol time, only multipath signals having secondary signal propagation path delays less than a symbol time may be processed to remove multipath interference.

In addition, typical indoor multipath signals have delays of 10-100 nanoseconds (ns), and the chip interval in an 802.11(b) system is 91 ns. Therefore, the delay of multipath signals may be less than the time interval of a chip. Typically, estimation of multipath signals with proper implementation complexities is based on detecting peaks in results of a correlation between received data and a pseudo random noise sequence. The width (temporal resolution) and shape of each correlation peak is determined by chip pulse creation performed by the transmitter. However, there may be one or more of multipath signals occurring in a single chip interval, which would cause overlapping correlation peaks and may not be detected. Hence, these systems may not correctly detect or estimate multipath signals occurring within a single chip interval.

Thus, there remains a need for a method and supporting apparatus that provides for multipath signal compensation (interference cancellation) over a broad range of multipath delay spreads and having sub-chip resolution. More particularly, there remains a need for a method and supporting apparatus for identifying and characterizing secondary signal propagation paths relative to a main signal propagation path that accommodates one or more multipath signals within a single chip interval.

SUMMARY OF THE INVENTION

The present invention provides a method and apparatus for estimating a multipath channel with sub-chip resolution. In general, secondary signals are characterized based on correlating a received signal, which includes multipath signals, with a pseudo-random noise code. An inverse filter operates to increase a temporal resolution of results of the correlation of the received signal and the pseudo-random noise code by substantially canceling effects of pulse creation in an associated transmitter. The increased temporal resolution of the results of the correlation allows secondary multipath signals occurring within the same chip interval as another multipath signal to be detected and estimated correctly.

The output of the inverse filter is a modified version of the results of the correlation of the received signal and the pseudo-random noise code having increased temporal resolution. Hence, correlation peaks in the modified version of the results of the correlation are narrower than correlation peaks in the results of the correlation. Therefore, a single wide peak in the results of the correlation may be correctly separated into two or more narrow correlation peaks representing two or more multipath signals occurring within the same chip interval.

The output of the inverse filter is provided to estimation circuitry including a peak detection circuit and a parameter estimation circuit. The peak detection circuit operates to detect peaks in the output of the inverse filter, where the peaks correspond to occurrences of the multipath signals. Based on detecting the peaks, the peak detection circuit determines delays for each of the secondary multipath signals with respect to the main multipath signal. The parameter estimation circuit estimates characteristics of each of the secondary multipath signals based on the output of the inverse filter and the delays of each of the secondary multipath signals.

In an exemplary embodiment, the method and apparatus of the present invention may be used in direct sequence spread spectrum (DSSS) communication systems to identify, select, and process main and secondary multipath signals for cancellation of the secondary signals. For example, a receiver implementing an equalizer responsible for cancellation of secondary signals may include the channel estimation circuit of the present invention for characterization of each of the secondary signals.

In other exemplary embodiments, the method and apparatus of the present invention may be used in DSSS communications systems to identify, select, and process main and secondary signals for improvements in signal-to-noise ratio (SNR), rather than for cancellation purposes. For example, a RAKE receiver may incorporate the training method of the present invention to identify and characterize the strongest multipath signals so that the individual RAKE fingers may be synchronized with a selected number of these strongest multipath signals. Then, the secondary path delay information developed in accordance with the training method supports the coherent combination operations performed by the RAKE receiver to gain improved SNR through multipath signal combining.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
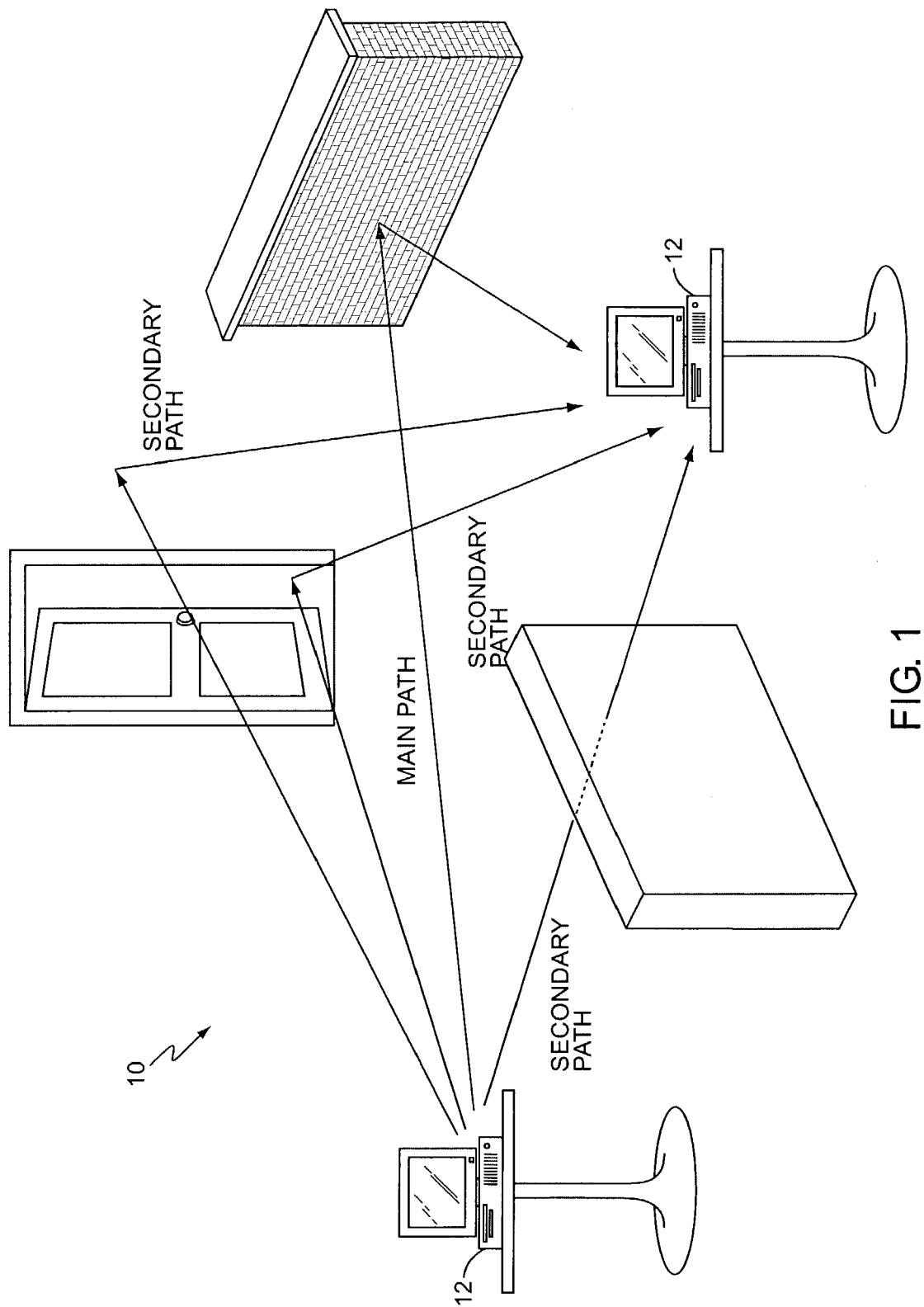
FIG. 1 illustrates a wireless communications environment subject to multipath signal reception.

FIG. 1 illustrates a wireless communications environment 10 subject to multipath interference. While FIG. 1 depicts two PCs 12 in wireless communications with each other, as might be expected in a wireless local area network (WLAN) environment, the present invention may be advantageously applied in any DSSS communications systems subject to multipath interference. As illustrated, multipath signals arise from intervening obstacles between a transmitter and a receiver—in this case, a transmitting PC 12 and a receiving PC 12. While not explicitly illustrated in FIG. 1, it will be readily appreciated that the multipath signals received by the receiving PC 12 may be subject to differing levels of attenuation and phase shifting based on the specific signal path followed by each signal. In the context of this disclosure, the main path signal is not necessarily the signal following the most direct route to the receiver; rather it is the strongest of the received multipath signals.

Figure 2A:
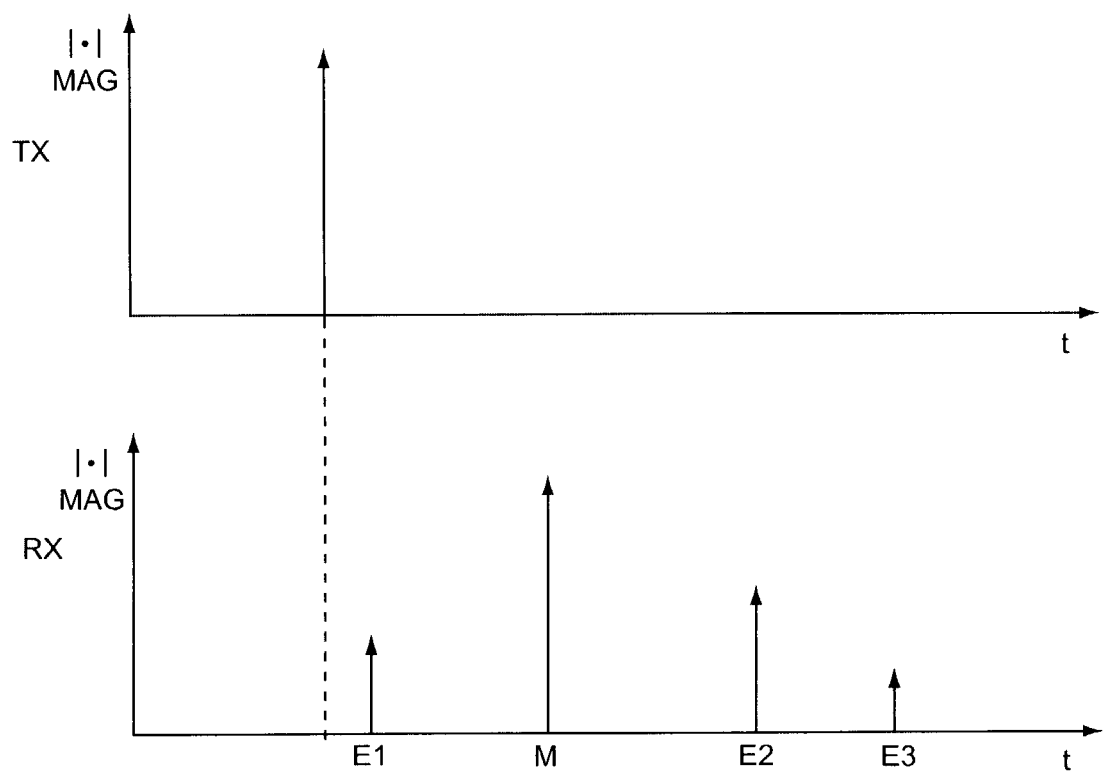
FIG. 2A illustrates the influence of multiple propagation paths on a received signal.

Because the multipath signals follow different signal paths of differing lengths, the various signals received by the receiver are subject to time dispersion. That is, the multipath signals are offset from one another by an amount of time proportionate to the difference in signal path length. FIG. 2A illustrates this time dispersion phenomenon. In FIG. 2A, the upper and lower horizontal time axes are aligned. An idealized impulse signal represents the transmitted data. Although the transmitter outputs a single clean impulse, the receiver actually receives multiple impulses at different times, with different amplitudes and phase due to multipath. The received signal with the largest amplitude is deemed the main path signal, denoted by "M" in FIG. 2A. The remaining, weaker signals are deemed echo or secondary multipath signals, and are denoted as $E_1 \ldots E_3$. Reception performance requirements and processing time limitations are considerations in choosing the number of secondary signals (echo signals) that will be characterized. However, any number of secondary signals may be characterized.

Figure 2B:
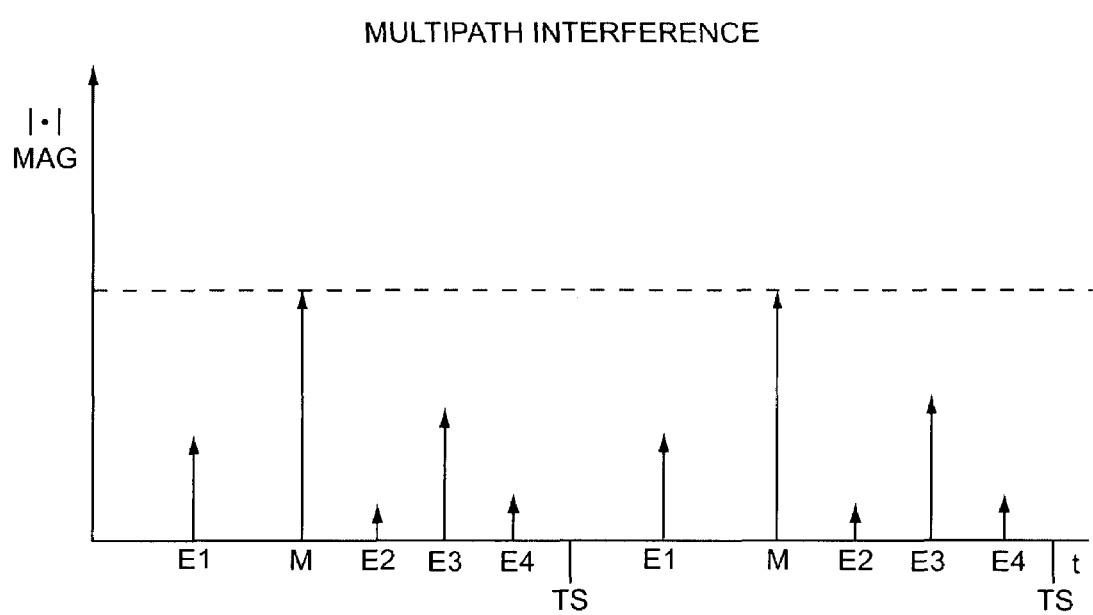
FIG. 2B illustrates the problem of inter-symbol interference in a sequence of received symbols.

In DSSS systems, information is transmitted from a transmitter to a receiver as a series of chips, with a defined number of chips forming a symbol. Each symbol corresponds to one or more known binary values. Thus, by decoding the received symbols, the receiver can re-create the binary data sent by the transmitter. Of course, to successfully decode these symbols, the receiver must synchronize with the transmitter's chip and symbol timing. FIG. 2B illustrates a sequence of received signals over at least two symbol times ($T_S$). What is not immediately apparent from FIG. 2B is whether one or more multipath events (echo signals) within a given symbol's time slot arises from the current symbol's transmission or from transmission of the previous symbol. Without the ability to make this determination, ISI cannot be effectively mitigated. Further, it is possible that two of the multipath signals occur within one chip time (chip interval), and therefore require sub-chip resolution to be detected and estimated correctly. The training method described herein provides an exemplary technique for identifying and characterizing multipath events that may occur within a single chip interval and with time offsets that may exceed one or more symbol times, and thus provides methods for identifying and compensating for ISI.

Figure 3:
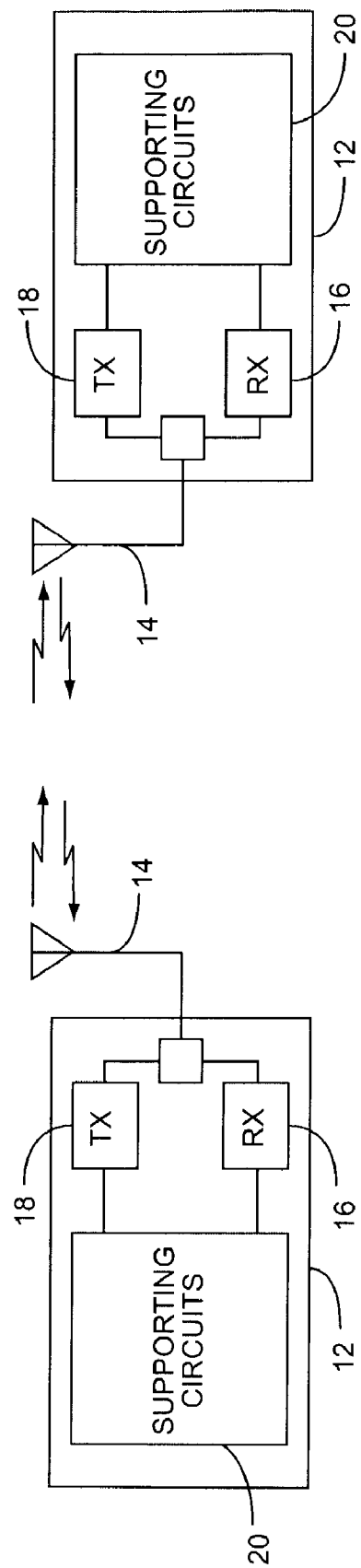
FIG. 3 illustrates an exemplary wireless networking system in which the present invention may be advantageously practiced.

FIG. 3 depicts an exemplary PC-based WLAN environment in which the various aspects of the present invention may be advantageously practiced. PCs 12 communicate with one another via wireless signaling, transmitting and receiving signals through antennae 14. Each PC 12 includes an exemplary communications receiver (RX) 16 supporting the training method and multipath signal equalization of the present invention, a compatible transmitter (TX) 18, and supporting circuitry 20. FIG. 3 is not meant as a depiction of actual structure for the inter-organization of PC 12; rather, FIG. 3 provides a functional depiction for the inclusion of the communications receiver 16 within a typical WLAN environment. The PCs 12 send and receive information via transmitters 18 and communications receivers 16, respectively. Such communications may be peer-to-peer (between PCs), or may be routed through a hub or server equipped with a wireless interface. The actual network organization and hierarchical structure used in a given application is not important with respect to understanding the present invention.

Ideally, the communications receiver 16 is implemented as a single integrated circuit, including portions supporting programmed operation, but may be implemented as a cooperative collection of integrated circuit devices collectively supporting the same functionality. Exemplary embodiments of the communications receiver 16 include the channel estimation circuitry 26 of the present invention, as detailed below. However, the communications receiver 16 represents an exemplary communications system, and, therefore, should not be construed as limiting the range of applications for the channel estimation circuitry 26. Indeed, the channel estimation circuitry 26 may be advantageously included in a range of communication system types.

Figure 4:
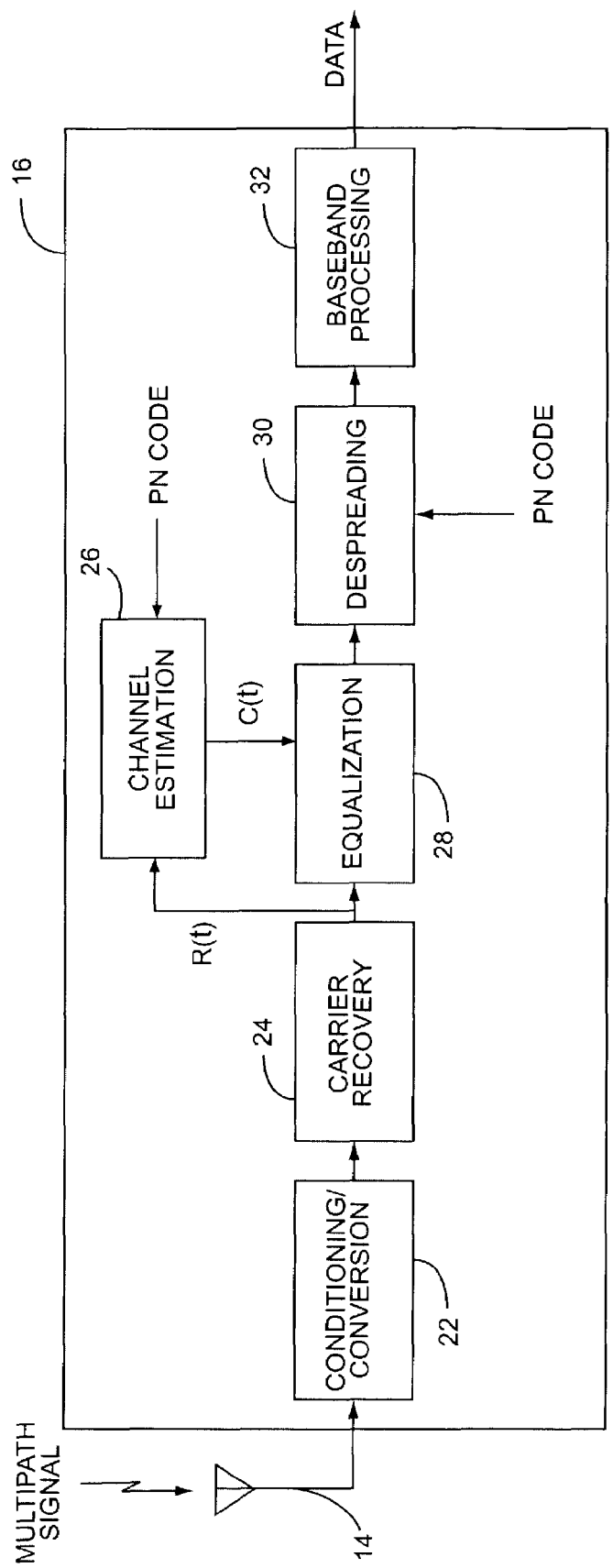
FIG. 4 is a generalized block diagram of an exemplary communications receiver that may advantageously include the present invention.

FIG. 4 provides a more detailed illustration of the communications receiver 16 introduced in FIG. 3. The communications receiver 16 includes a conditioning and conversion circuit 22, a carrier recovery circuit 24, the channel estimation circuit 26, an equalizer 28, a despreading circuit 30, and a baseband processing circuit 32.

Signals received through antenna 14 pass through the conditioning and conversion circuit 22, where they are filtered, optionally amplified, and converted from analog to digital format. Digital information then passes to the carrier recovery circuit 24. The carrier recovery circuit 24 maps received symbols in the main path signal to one of the ideal constellation points defined by the transmit signal modulation scheme. For example, QPSK-modulated symbols map to one of the 4 defined constellation points, namely +/−1 and +/−j. Output signal R(t) from the carrier recovery circuit 24 passes to the channel estimation circuit 26 and the equalizer 28 in the illustrated embodiment.

In order for the equalizer 28 to effectively cancel selected multipath interference from the received multipath signal, the channel estimation circuit 26 must estimate the multipath channel. The channel estimation circuit 26 receives the output signal R(t) from the carrier recovery circuit 24 and produces an estimate of the multipath channel C(t), which may include time offset, magnitude, and phase information for any number of the multipath signals. According to the present invention, the channel estimation circuit 26 has sub-chip resolution, and is therefore capable of detecting and estimating multipath signals occurring within a single chip interval. The details of the channel estimation circuit 26 are discussed in more detail below.

In the illustrated embodiment, the channel estimation circuit 26 provides the estimate of the multipath channel C(t) to the equalizer 28. The equalizer 28 performs cancellation of the secondary multipath signals. The details of the equalizer 28 are not important to the operation of the present invention. However, the equalizer 28 may be the equalizer described and disclosed in related and commonly assigned U.S. patent application Ser. No. 10/224,001 entitled "IMPROVED METHOD AND APPARATUS FOR MULTIPATH SIGNAL COMPENSATION IN SPREAD SPECTRUM COMMUNICATIONS SYSTEMS" filed on Aug. 20, 2002, which issued as U.S. Pat. No. 7,054,396 on May 30, 2006, and U.S. patent application Ser. No. 09/629,588 entitled "METHOD AND APPARATUS FOR MULTIPATH SIGNAL COMPENSATION IN SPREAD SPECTRUM COMMUNICATIONS SYSTEMS" filed on Jun. 31, 2000, which issued as U.S. Pat. No. 6,728,324 on Apr. 27, 2004, both incorporated herein by reference in their entireties.

Once configured by the channel estimation circuit 26, the equalizer 28 compensates the main path signal for multipath interference caused by the secondary signals. The compensated output from the equalizer 28 then passes to the despreading circuit 30, where signal correlation operations provide the baseband processor 32 with despread, received signal samples. The baseband processor 32 extracts the received data from these received signal samples.

In one embodiment, the channel estimation circuit 26 may be used only during estimation of the magnitude, phase, and delay of each of the secondary signals with respect to the main signal. This embodiment may be beneficial for 802.11 (b) environments in which estimation is preferably performed during reception of a preamble and header of each data packet. Accordingly, the output of the channel estimation circuit 26 may essentially be turned off after estimation is complete.

It is important to note that the channel estimation circuit 26 is not limited to the receiver 16 having the equalizer 28 as illustrated in FIG. 4. The channel estimation circuit 26 may be implemented in various types of systems including but not limited to a RAKE receiver and a RAKE filter.

Figure 5:
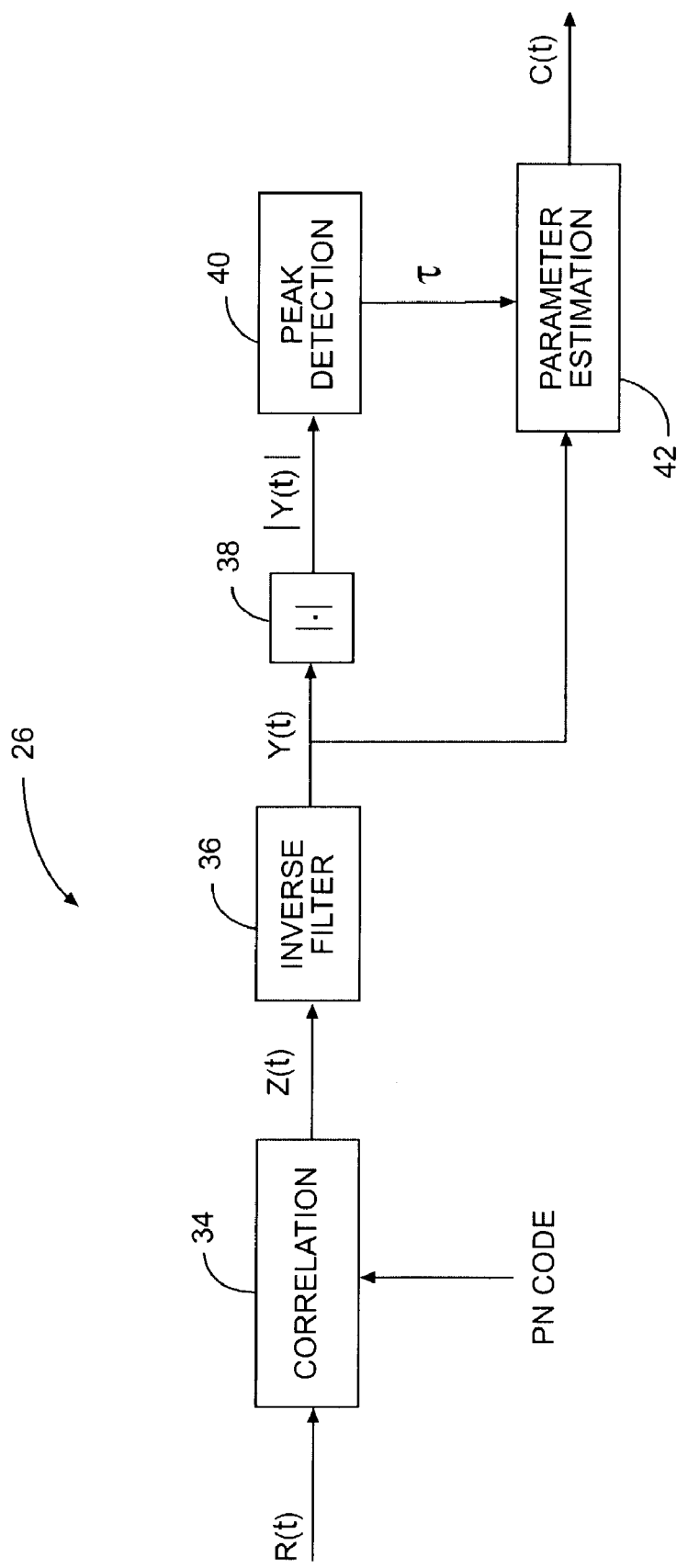
FIG. 5 is a more detailed functional block diagram of the channel estimation circuit of FIG. 4.

FIG. 5 illustrates the channel estimation circuit 26 in more detail. The channel estimation circuit 26 includes correlation circuit 34, inverse filter 36, absolute value circuit 38, peak detection circuit 40, and parameter estimation circuit 42. The absolute value circuit 38 may optionally be provided as part of the peak detection circuit 40. The correlation circuit 34 receives the signal R(t) from carrier recovery circuit 24 and operates to correlate the signal R(t) and a pseudo-random noise (PN) code, which is the same PN code used by the transmitter 18 (FIG. 3). In the preferred embodiment, the correlation circuit 34 buffers N samples of the signal R(t), where N is the number of chips in a symbol, thereby creating a vector of samples defined as:

$$X(t) = \{R(t_0), R(t_1), R(t_2), \ldots, R(t_{N-1})\}.$$

Further, the correlation circuit 34 creates a PN vector having N elements of the PN code, where the PN vector is defined as:

$$C = \{C_0, C_1, C_2, \ldots, C_{N-1}\}.$$

At each sample clock, the correlation circuit 34 computes the inner product of the vector of samples X(t) and the PN vector C to produce a correlated signal Z(t) given by the following equation:

$$Z(t) = X(t)C(t)^H = R(t_0) \; C_0^* + R(t_1)C_1^* + \ldots + R(t_{n-1})C_{n-1}^*,$$

where the superscript H denotes Hermitian conjugate and the superscript * denotes complex conjugate.

In order to properly detect multipath signals occurring in the same chip time as another multipath signal, the inverse filter 36 performs inverse filtering on the correlated signal Z(t) from the correlation circuit 34. In essence, the inverse filter 36 operates to increase the temporal resolution of the correlated signal Z(t) based on substantially canceling the effects of pulse creation in the transmitter 18 (FIG. 3), thereby producing the filtered signal Y(t) having sub-chip resolution. The filtered signal Y(t) is a modified version of the correlated signal Z(t) having increased temporal resolution, where the increased temporal resolution corresponds to narrower correlation peaks corresponding to each multipath signal.

The increased temporal resolution of the filtered signal Y(t) allows two or more multipath signals occurring within a single chip time to be detected and estimated more correctly by decreasing the width of each of the correlation peaks. Prior to passing through the inverse filter 36, two or more multipath signals occurring within a single chip interval overlap to create a single correlation peak. After the inverse filter 36, the correlation peaks are narrowed, thereby separating the overlapping correlation peaks into two or more separate peaks. In addition, the inverse filter 36 improves estimation of the multipath channel by reducing interpath leakage, overlapping, and/or interference. The operation of the inverse filter 36 is best explained by including some discussion of the transmitter 18 (FIG. 3) and pulse creation in the transmitter 18 are described in more detail below.

After inverse filtering, the absolute value circuit 38, the peak detection circuit 40, and the parameter estimation circuit 42 operate on the filtered signal Y(t) to produce the estimate of the multipath channel C(t). The absolute value circuit 38 receives the filtered signal Y(t) from the inverse filter 36 and produces a signal |Y(t)|, which is the absolute value of the filtered signal Y(t). The peak detection circuit 40 operates on the signal |Y(t)| to determine the delays ($\tau$) of each of the secondary signals with respect to the main signal based on detecting peaks in the signal |Y(t)|. The parameter estimation circuit 42 operates to produce the estimate of the multipath channel C(t) based on the filtered signal Y(t) from the inverse filter 36 and the delays ($\tau$) from the peak detection circuit 40. The estimate of the multipath channel C(t) includes information such as time offset, magnitude, and delays of each of the secondary signals with respect to the main signal.

FIGS. 6A-6D are an exemplary illustration of the output of the correlation circuit 34 and the inverse filter 36 of FIG.

Figure 6A:
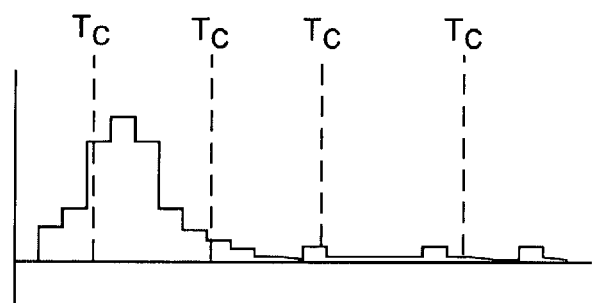
FIG. 6A illustrates the output of the correlation circuitry of FIG. 5 during reception of a first multipath signal.
Figure 6B:
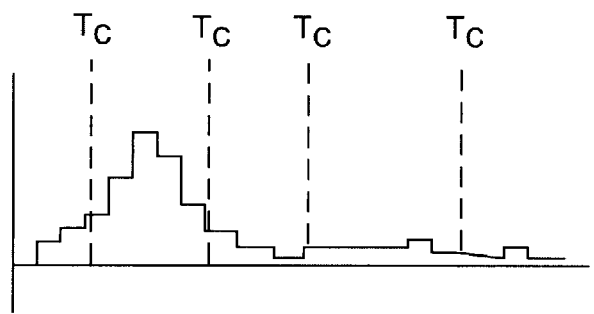
FIG. 6B illustrates the output of the correlation circuitry of FIG. 5 during the reception of a second multipath signal.
Figure 6C:
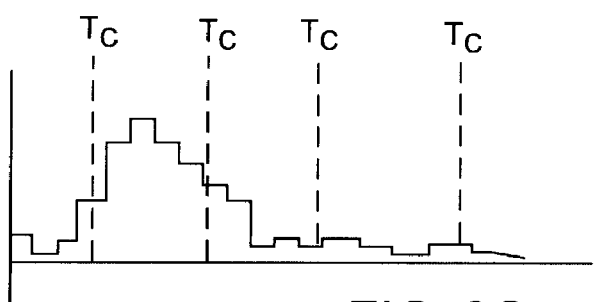
FIG. 6C illustrates the output of the correlation circuitry of FIG. 5 when the first and second multipath signals of FIGS. 6A and 6B, respectively, occur during a single chip interval.
Figure 6D:
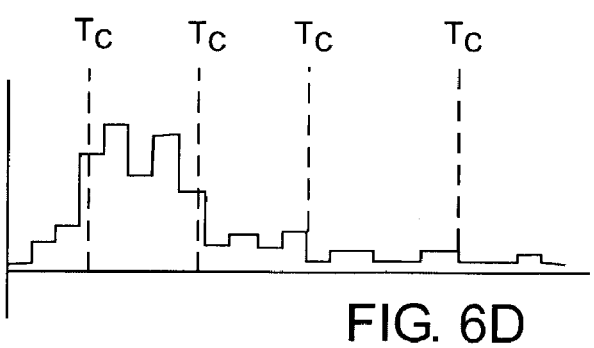
FIG. 6D illustrates the output of the inverse filter of FIG. 5 when the first and second multipath signals of FIGS. 6A and 6B, respectively, occur during a single chip interval.

5 according to the present invention. In FIGS. 6A-6D a first and second multipath signal occur during a single chip interval $T_C$. FIG. 6A illustrates the output of the correlation circuit 34 if only the first multipath signal were received, and FIG. 6B illustrates the output of the correlation circuit 34 if only the second multipath signal were received. However, for this illustration, both the first and second multipath signals occur during the same chip interval. Hence, FIG. 6C illustrates the output of the correlation circuit 34 when the first and second multipath signals of FIGS. 6A and 6B occur during a single chip interval. In essence, the correlation peaks of 6A and 6B are combined to produce a single wide correlation peak. Therefore, the first and second multipath signals cannot be detected properly from the output of the correlation circuit 34. FIG. 6D illustrates the output of the inverse filter 36. According to the present invention, the inverse filter 36 operates to decrease the width of the correlation peaks in the output of the correlation circuit 34, thereby separating the wide correlation peak of 6C into two correlation peaks corresponding to the two multipath signals. The two correlation peaks of FIG. 6D allow the first and second multipath signals occurring during the same chip interval to be detected and estimated correctly.

Figure 7:
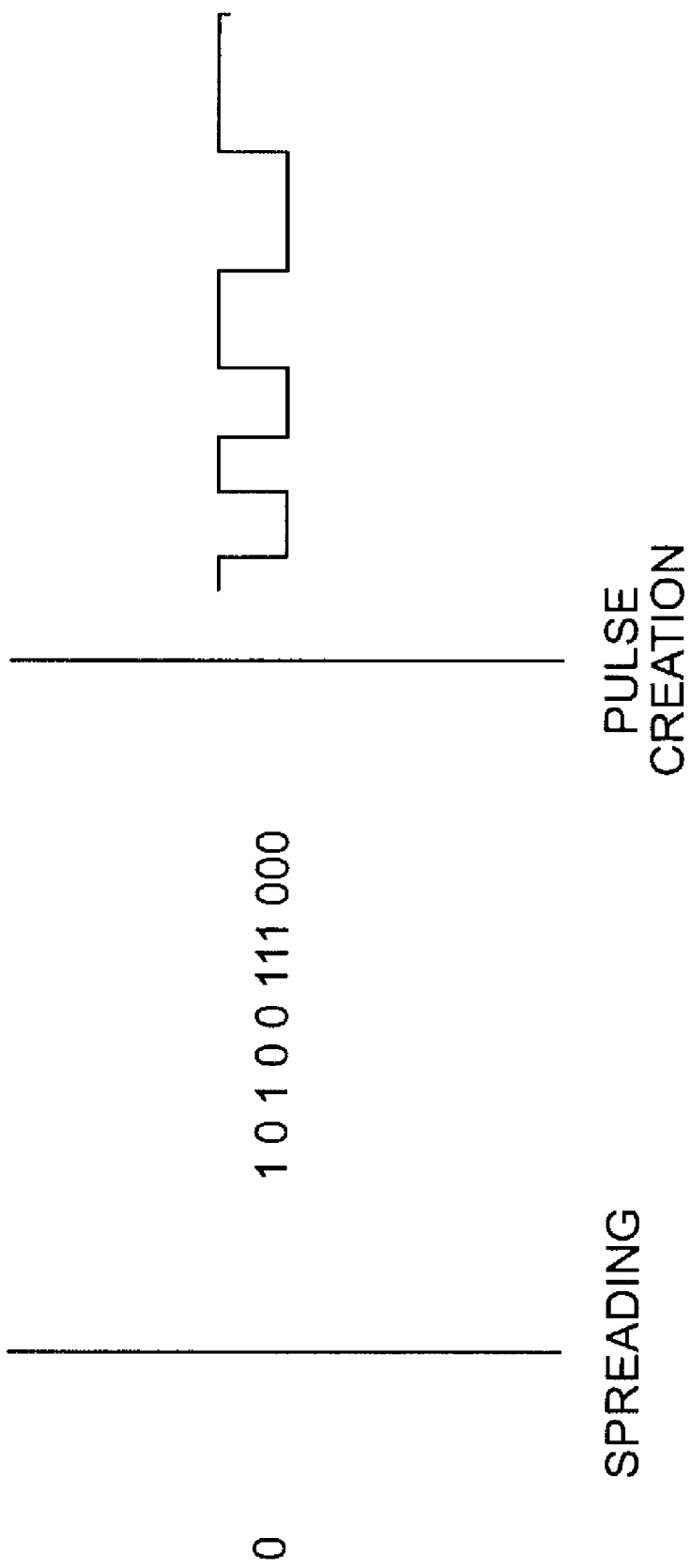
FIG. 7 illustrates a pulse creation operation according to one embodiment of the present invention.

As mentioned previously, the inverse filter 36 operates to substantially cancel the effects of the pulse creation operation in the transmitter 18. In order to fully explain the operation of the inverse filter 36, a discussion of the pulse creation operation as illustrated in FIG. 7 is necessary. For conciseness, FIG. 7 illustrates the pulse creation operation with respect to a single data bit (0). First, spreading is performed to produce a chip sequence (10100111000) from the data bit (0). Then, the pulse creation operation creates a series of pulses from the chip sequence. Pulse creation is typically performed by mapping each bit of the chip sequence to a corresponding pulse. The pulses, which represent the data, are transmitted to the receiver 16. As a result of the pulse creation operation, the temporal resolution of the output of the correlation circuit 34 (FIG. 5) is such that multipath signals occurring during the same chip interval overlap to produce a single correlation peak. Thus, the multipath signals occurring during the single chip interval are not detected and/or estimated correctly. It is to be noted that there are many variations of the pulse creation and spreading operations and that FIG. 7 merely illustrates one embodiment of the pulse creation operation. The inverse filter 36 operates to substantially cancel the effects of the pulse creation operation in the transmitter 18, thereby producing a filtered signal Y(t) having sub-chip resolution. The filtered (modified) signal Y(t) is a modified version of the correlated signal Z(t) having increased temporal resolution, where temporal resolution is the width of the correlation peaks in the correlated signal Z(t) and the filtered signal Y(t). Therefore, the correlation peaks in the filtered signal Y(t) are narrower than the correlation peaks in the correlated signal Z(t).

The pulse creation operation of the transmitter 18 (FIG. 3) can also be described mathematically. In essence, the pulse creation operation to convert a bit into a physical pulse for transmission has a corresponding transfer function, P(z). To undo the effects of pulse creation, the inverse filter 36 at the receiver 16 has a transfer function H(z) that is substantially the inverse of the transfer function P(z) of the pulse creation operation in the transmitter 18. The pulse creation operation can be described as a filter having a chip sequence of impulses (zero duration chip pulses) as an input. As an example, the chip pulses may be square having a height of 1 and the sampling rate may be 4 samples per chip. The pulse creation operation may then be described as:

$p(t)=1$ when $t=0, 1, 2,$ and 3, and $p(t)=0$ elsewhere.

Therefore, for a chip sequence of [1, −1, 1, . . . ] and a sampling rate of 4 samples per chip, the input to the pulse creation operation in the discrete time domain is [1, 0, 0, 0, −1, 0, 0, 0, 1, 0, 0, 0, . . . ], and the output of the pulse creation operation is [1, 1, 1, 1, −1, −1, −1, −1, 1, 1, 1, 1, . . . ]. Accordingly, the transfer function of the pulse creation operation p(t) is:

$P(z)=1+z^{-1}+z^{-2}+z^{-3}=(1+z^{-1})(1-jz^{-1})(1+jz^{-1})$, where zeros occur at $z=-1$ (sampling rate/2) and $z=\pm j$ (±sampling rate/4).

The inverse filter 36 operates to substantially undo the effects of the pulse creation operation by creating poles at approximately the same frequencies of the zeros of the transfer function P(z) of the pulse creation operation. In one embodiment the inverse filter 36 is a linear-phase finite impulse response (FIR) filter approximately having the desired magnitude response. However, the implementation cost of FIR filters is high due to the high order of the filters. Therefore, in the preferred embodiment, the inverse filter 36 is an all pole infinite impulse response (IIR) filter. Accordingly, for this example, the inverse filer 36 has the following transfer function:

$$H(z) = \frac{1}{(1 + \alpha z^{-2})(1 + \beta z^{-1})},$$

where alpha α and beta β are coefficients having a positive value in the range including 0 to 1 ($0 \leq \alpha \leq 1$ and $0 \leq \beta \leq 1$). The transfer function H(z) has poles at $z=\pm j\sqrt{\alpha}$ and $z=-\beta$, and the inverse filter 36 is approximately linear-phase when both alpha α and beta β are either 0 or new 1, respectively. When the inverse filter 36 is approximately linear-phase, the phase of filtered signal Y(t) is approximately a linear function of the frequency of the correlated signal Z(t). Further, by being approximately linear-phase, the inverse filter 36 essentially eliminates distortion of the filtered signal Y(t) due to the filtering process.

Since non-linearity in the phase response of the inverse filter 36 introduces distortion and error in the estimation of the multipath signals, it is desirable to select alpha α and beta β such that the inverse filter 36 is approximately liner-phase. When both alpha α and beta β are approximately 1, the poles of the transfer function H(z) approximately cancel out the zeros of the transfer function P(z) of the pulse creation operation, but the noise sensitivity of the inverse filter 36 increases dramatically. Therefore, the exact values of alpha α and beta β depend on the particular implementation and may be selected such that both the temporal resolution of the modified signal Y(t) and the noise sensitivity of the receiver 16 are at desirable levels and the inverse filter 36 is approximately liner-phase.

Figure 8:
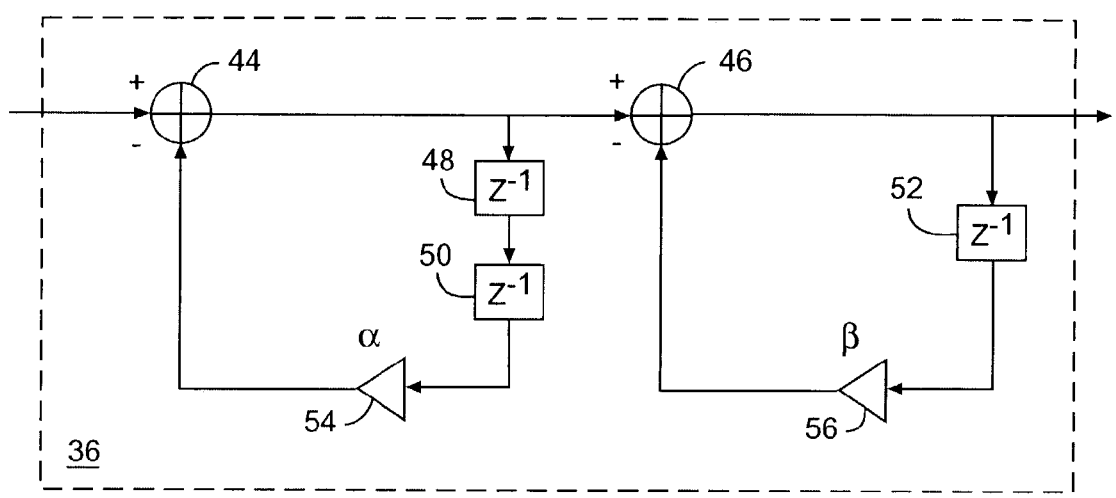
FIG. 8 is one embodiment the inverse filter component of FIG. 5.

FIG. 8 illustrates the inverse filter 36 according to the example above in more detail. In the example above, the inverse filter 36 has the impulse response:

$$H(z) = \frac{1}{(1+\alpha z^{-2})(1+\beta z^{-1})}.$$

The inverse filter 36 in FIG. 8 is a physical implementation of the transfer function H(z).

The inverse filter 36 includes summing nodes 44 and 46, delays 48, 50, and 52, and multipliers 54 and 56. The first summing node 44, first and second delays 48 and 50, and first multiplier 54 form a first feedback loop corresponding to the $1+\alpha z^{-2}$ term in the transfer function H(z) of the inverse filter 36. The second summing node 46, delay 52, and second multiplier 56 form a second feedback loop corresponding to the $1+\beta z^{-1}$ term in the transfer function H(z) of the inverse filter 36. The first and second feedback loops form the inverse filter 36 having the transfer function H(z).

In addition, the first multiplier 54 and the second multiplier 56 have multiplicands alpha α and beta β, respectively, which correspond to the coefficients alpha α and beta β of the transfer function H(z) given above. Further, if a particular design selects alpha α or beta β to be zero, the respectively one of the first or second feedback loops may be removed from the design of the inverse filter 36. For example, if beta β is selected to be zero, then the second feedback loop including the second summing node 46, third delay 52, and second multiplier 56 may be removed from the inverse filter 36, thereby providing the output of the first summing node 44 as the output of the inverse filter 36. As discussed above, the exact values of alpha α and beta β are dependent on the particular design and may be selected such that sub-chip resolution is achieved and the noise sensitivity of the receiver 16 is at a desirable level.

It is important to note that the example above for the inverse filter 36 is merely exemplary and should not be considered as limiting. The inverse filter 36 operates to essentially undo the effects of the pulse creation operation performed by the transmitter 18 (FIG. 3). The exact details of the inverse filter 36 such as its transfer function depends on the details of the pulse creation operation in the transmitter 18.

Those skilled in the art will recognize improvements and modifications to the preferred embodiments of the present invention. All such improvements and modifications are considered within the scope of the concepts disclosed herein and the claims that follow.

What is claimed is:

1. A system for estimating characteristics of multipath signals comprising:
    a) a correlation circuit adapted to correlate a received signal with a despreading code and produce a correlated signal, the received signal including multipath signals resulting from transmitting a signal from a transmitter;
    b) an inverse filter adapted to filter the correlated signal to substantially cancel effects of pulse creation in the transmitter and provide a filtered signal; and
    c) circuitry adapted to estimate characteristics of the multipath signals based on the filtered signal.

2. The system of claim 1 wherein a first transfer function representing the inverse filter is approximately the inverse of a second transfer function representing the pulse creation in the transmitter.

3. The system of claim 1 wherein the inverse filter increases the ability of the circuitry to correctly estimate the characteristics of the multipath signals.

4. The system of claim 1 wherein the inverse filter increases the ability of the circuitry to correctly estimate the characteristics of two or more of the multipath signals occurring within a single chip interval.

5. The system of claim 1 wherein the filtered signal is a modified version of the correlated signal having increased temporal resolution.

6. The system of claim 1 wherein the inverse filter substantially cancels the effects of the pulse creation in the transmitter by creating poles at essentially the same frequencies of zeros created by the pulse creation.

7. The system of claim 1 wherein the inverse filter is an infinite impulse response filter.

8. The system of claim 1 wherein the inverse filter is an all-pole infinite impulse response filter.

9. The system of claim 1 wherein the inverse filter is a finite impulse response filter.

10. The system of claim 1 wherein the inverse filter is approximately linear-phase.

11. The systems of claim 1 wherein one or more coefficients of a transfer function of the inverse filter are selected such that the filtered signal has a desired temporal resolution.

12. The system of claim 11 wherein the one or more coefficients are further selected such that a noise sensitivity of the inverse filter is at a desirable level.

13. The system of claim 12 wherein the one or more coefficients are further selected such that the inverse filter is approximately linear-phase.

14. The system of claim 1 wherein at least two of the multipath signals occur during a single chip interval.

15. The system of claim 1 wherein the multipath signals include a main path signal and secondary path signals, further wherein the circuitry comprises:
    a) peak detection circuitry adapted to detect peaks in the filtered signal and estimate delays of one or more of the secondary path signals with respect to the main path signal; and
    b) parameter estimation circuitry adapted to produce the estimated characteristics of each of the one or more secondary path signals with respect to the main path signal based on the delays and the filtered signal.

16. The system of claim 1 wherein the multipath signals include a main path signal and secondary path signals, further wherein the estimated characteristics include estimates of a magnitude, a phase, and a delay of one or more of the secondary path signals with respect to the main path signal.

17. A method of estimating characteristics of multipath signals comprising:
    a) correlating a received signal with a despreading code thereby producing a correlated signal, the received signal including multipath signals resulting from transmitting a signal from a transmitter;
    b) filtering the correlated signal to substantially cancel effects of pulse creation in the transmitter thereby producing a filtered signal; and
    c) estimating characteristics of the multipath signals based on the filtered signal.

18. The method of claim 17 wherein a first transfer function representing the filtering step is approximately the inverse of a second transfer function representing the pulse creation in the transmitter.

19. The method of claim 17 wherein the filtering step increases the ability of the estimating step to correctly estimate the characteristics of the multipath signals.

20. The method of claim 17 wherein the filtering step increases the ability of the estimating step to correctly estimate the characteristics of two or more of the multipath signals occurring within a single chip interval.

21. The method of claim 17 wherein the filtered signal is a modified version of the correlated signal having increased temporal resolution.

22. The method of claim 17 wherein the filtering step comprises creating poles at essentially the same frequencies of zeros created by the pulse creation in the transmitter, thereby substantially canceling effects of the pulse creation in the transmitter.

23. The method of claim 17 wherein the filtering step comprises selecting one or more coefficients of an associated transfer function such that the filtered signal has a desired temporal resolution.

24. The method of claim 23 wherein the filtering step further comprises further selecting the one or more coefficients such that an associated noise sensitivity is at a desirable level.

25. The method of claim 24 wherein the filtering step further comprises further selecting the one or more coefficients such that the associated transfer function is approximately linear-phase.

26. The method of claim 17 wherein the estimating characteristics step comprises estimating characteristics of at least one of the multipath signals which occurs during the same chip interval as another of the multipath signals.

27. The method of claim 17 wherein the multipath signals include a main path signal and secondary path signals, further wherein the estimating characteristics step comprises:
   a) detecting peaks in the filtered signal;
   b) estimating delays of one or more of the secondary signals with respect to the main path signal based on the detecting step; and
   c) deriving the characteristics of the one or more secondary signals with respect to the main signal based on the delays and the filtered signal.

28. The method of claim 17 wherein the multipath signals include a main path signal and secondary path signals, further wherein the estimating characteristics step comprises estimating a magnitude, a phase, and a delay of one or more of the secondary path signals with respect to the main path signal.

29. A system for estimating characteristics of multipath signals with sub-chip resolution comprising:
   a) means for correlating a received signal with a despreading code and produce a correlated signal, the received signal including multipath signals resulting from transmitting a signal from a transmitter;
   b) means for filtering the correlated signal to substantially cancel effects of pulse creation in the transmitter thereby producing a filtered signal; and
   c) means for estimating characteristics of the multipath signals based on the filtered signal.

30. The system of claim 29 wherein a first transfer function representing the means for filtering the correlated signal is approximately the inverse of a second transfer function representing the pulse creation in the transmitter.

31. The system of claim 29 wherein the means for filtering increases the ability of the means for estimating to correctly estimate the characteristics of the multipath signals.

32. The system of claim 29 wherein the means for filtering increases the ability of the means for estimating to correctly estimate the characteristics of two or more of the multipath signals occurring within a single chip interval.

33. The system of claim 29 wherein the filtered signal is a modified version of the correlated signal having increased temporal resolution.

34. The system of claim 33 wherein the means for filtering the correlated signal substantially cancels the effects of the pulse creation in the transmitter by creating poles at essentially the same frequencies of zeros created by the pulse creation.

35. The system of claim 29 wherein the means for filtering the correlated signal is approximately linear-phase.

36. The system of claim 29 wherein one or more coefficients of a transfer function of the means for filtering the correlated signal are selected such that the filtered signal has a desired temporal resolution.

37. The system of claim 36 wherein the one or more coefficients are further selected such that a noise sensitivity of the means for filtering the correlated signal is at a desirable level.

38. The system of claim 37 wherein the one or more coefficients are further selected such that the means for filtering the correlated signal is approximately linear-phase.

39. The system of claim 29 wherein at least two of the multipath signals occur during a single chip interval.

40. The system of claim 29 wherein the multipath signals include a main path signal and secondary path signals, further wherein the means for estimating characteristics of the one or more secondary signals comprises:
   a) means for detecting peaks in the filtered signal and estimating delays of one or more of the secondary path signals with respect to the main path signal; and
   b) means for deriving the estimates of each of the one or more secondary path signals with respect to the main path signal based on the delays and the filtered signal.

41. The system of claim 29 wherein the multipath signals include a main path signal and secondary path signals, further wherein the estimated characteristics include estimates of a magnitude, a phase, and a delay of one or more of the secondary path signals with respect to the main path signal.

* * * * *